US010007136B2

(12) United States Patent
Jung et al.

(10) Patent No.: US 10,007,136 B2
(45) Date of Patent: Jun. 26, 2018

(54) DISPLAY DEVICE HAVING NARROW BEZEL STRUCTURE WITH INTERMEDIATE FRAME ENGAGING BOTTOM FRAME COUPLING HOLE

(71) Applicant: Samsung Display Co., Ltd., Yongin-si, Gyeonggi-do (KR)

(72) Inventors: Minsu Jung, Asan-si (KR); Byungchan Kim, Yongin-si (KR); Juhwan Kim, Seoul (KR); Kyuhun Shim, Seongnam-si (KR); Cheolse Lee, Daegu (KR); Chunghui Lee, Cheongju-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 117 days.

(21) Appl. No.: 15/080,877

(22) Filed: Mar. 25, 2016

(65) Prior Publication Data

US 2016/0342015 A1 Nov. 24, 2016

(30) Foreign Application Priority Data

May 18, 2015 (KR) .................. 10-2015-0068917

(51) Int. Cl.
*G02F 1/1333* (2006.01)
(52) U.S. Cl.
CPC .............. *G02F 1/133308* (2013.01); *G02F 2001/133314* (2013.01); *G02F 2001/133317* (2013.01); *G02F 2201/465* (2013.01); *G02F 2202/28* (2013.01)

(58) Field of Classification Search
CPC ......... G02F 1/133308; G02F 1/133615; G02F 1/133608
See application file for complete search history.

(56) References Cited

U.S. PATENT DOCUMENTS

| 5,659,376 A * | 8/1997 | Uehara | G02F 1/133308 348/794 |
| 6,974,242 B1 * | 12/2005 | Chu | G02F 1/133308 362/633 |
| 7,679,694 B2 * | 3/2010 | Shirai | G02F 1/133308 349/58 |
| 8,730,425 B2 * | 5/2014 | Ji | G02F 1/133308 349/58 |

FOREIGN PATENT DOCUMENTS

| KR | 100686493 B1 | 2/2007 |
| KR | 1020070117133 A | 12/2007 |
| KR | 1020120005872 A | 1/2012 |
| KR | 1020120008706 A | 2/2012 |

* cited by examiner

*Primary Examiner* — Robert May
(74) *Attorney, Agent, or Firm* — Cantor Colburn LLP (57) ABSTRACT

A display device includes: a display panel which displays an image; an intermediate frame on which the display panel is disposed; and a lower frame coupled to the intermediate frame and in which a coupling hole is defined. The intermediate frame defines: a support portion thereof extended facing a lower surface of the display panel, and a coupling portion thereof extending from a lower surface of the support portion and toward the lower frame. The coupling portion of the intermediate frame extends through the coupling hole defined in the lower frame to be attached to a surface of the lower frame.

13 Claims, 5 Drawing Sheets

DISPLAY DEVICE HAVING NARROW BEZEL STRUCTURE WITH INTERMEDIATE FRAME ENGAGING BOTTOM FRAME COUPLING HOLE

This application claims priority to Korean Patent Application No. 10-2015-0068917, filed on May 18, 2015, and all the benefits accruing therefrom under 35 U.S.C. § 119, the contents of which in their entirety are herein incorporated by reference.

BACKGROUND

1. Field

Exemplary embodiments of the invention relate to a display device which includes a narrow bezel.

2. Description of the Related Art

Liquid crystal display ("LCD") devices are a type among flat panel display ("FPD") devices that have found a wide range of applications. An LCD device includes a display panel including two display substrates in which electrodes are disposed and a liquid crystal layer interposed between the two display substrates, and upon applying voltage to the electrodes, orientations of liquid crystal molecules in the liquid crystal layer are rearranged to adjust the amount of light transmitted through the display panel.

The LCD device, which is a passive-type light emitting device, includes the display panel displaying images, an intermediate frame on which the display panel is mounted, and a backlight assembly generating and providing light to the display panel. In the LCD device, the intermediate frame is coupled to a lower frame that forms a framework of the backlight assembly, such as using a coupling structure such as a hook.

In order to secure competitiveness of an image display product, development on LCD devices that have properties of slimness and light-weight has progressed. In particular, development is being conducted so as to decrease an overall exterior planar size of an LCD device by decreasing a bezel thereof which corresponds to a planar width between an outermost shape of the LCD device and an active area thereof in which an image is actually displayed.

SUMMARY

One or more exemplary embodiments of the invention are directed to a display device including a narrow bezel, and for which a coupling force between an intermediate frame and a lower frame therein is improved.

According to an exemplary embodiment of the invention, a display device includes: a display panel which displays an image; an intermediate frame on which the display panel is disposed; and a lower frame coupled to the intermediate frame and in which a coupling hole is defined. The intermediate frame defines: a support portion thereof extended facing a lower surface of the display panel, and a coupling portion thereof extending from a lower surface of the support portion and toward the lower frame. The coupling portion of the intermediate frame extends through the coupling hole defined in the lower frame to be attached to a surface of the lower frame.

The lower frame may define a bottom portion thereof and a side wall portion thereof which is bent from the bottom portion and extended along the coupling portion of the intermediate frame.

The side wall portion of the lower frame may define an inner surface thereof and an outer surface thereof which faces opposite to the inner surface. A length of coupling portion extending from the lower surface of the support portion may be bent at the coupling hole defined in the lower frame and face both the inner surface and the outer surface of the side wall portion of the lower frame.

The length of the coupling portion may be bent twice and dispose the coupling portion facing both the inner surface and the outer surface of the side wall portion of the lower frame.

The display device may further include an adhesive member between the coupling portion of the intermediate frame and the side wall portion of the lower frame.

The coupling portion of the intermediate frame may be attached to a side surface of the display panel.

The display device may further include an adhesive member between the coupling portion of the intermediate frame and the side wall portion of the lower frame and between the coupling portion of the intermediate frame and the display panel.

The display device may further include: a light source which is on the bottom portion of the lower frame and generates and emits light; and a light guide plate which is between the bottom portion of the lower frame and the display panel and guides the light emitted from the light source toward the display panel.

The inner surface of the side wall portion of the lower frame may face a side surface of the light guide plate.

The display device may further include an adhesive member between the intermediate frame and the display panel.

The side wall portion of the lower frame may define an inner surface thereof and an outer surface thereof which faces opposite to the inner surface. A length of the coupling portion extending from the lower surface of the support portion may be bent at the coupling hole defined in the lower frame and face the inner surface of the side wall portion and a lower surface of the bottom portion of the lower frame.

The length of the coupling portion of the intermediate frame may have an "L" shape cross-section and dispose the coupling portion facing both the inner surface of the side wall portion of the lower frame and the lower surface of the bottom portion of the lower frame.

The display device may further include an adhesive member between the coupling portion of the intermediate frame and the bottom portion of the lower frame.

The display device may further include a light source which is on the bottom portion of the lower frame and generates and emits light; and a light guide plate which is between the bottom portion of the lower frame and the display panel and guides the light emitted from the light source toward the display panel.

The coupling portion extending from the lower surface of the support portion may be attached to a side surface of the display panel.

The foregoing is illustrative only and is not intended to be in any way limiting. In addition to the illustrative embodiments, and features described above, further embodiments, and features will become apparent by reference to the drawings and the following detailed description.

BRIEF DESCRIPTION OF THE DRAWINGS

The above and other features of the present disclosure of invention will be more clearly understood from the following detailed description taken in conjunction with the accompanying drawings, in which.

DETAILED DESCRIPTION

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The spatially relative terms "below," "beneath," "lower," "above," "upper," and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In order to achieve a relatively narrow bezel in a liquid crystal display (LCD") device, a thickness in a top plan view of a side wall of a lower frame that forms a framework of a backlight assembly in the LCD device is decreased. However, due to the thickness in the top plan view of a hook or a screw that couples the lower frame to an intermediate frame of the LCD device, there is a limit in decreasing the top plan view width of the bezel. Further, in accordance with the decrease in the width of the bezel, a coupling force of hook coupling or screw coupling between the intermediate frame and the lower frame is diminished.

Hereinafter, an exemplary embodiment of a display device according to the invention will be described with reference to FIGS. 1 and 2.

Figure 1:
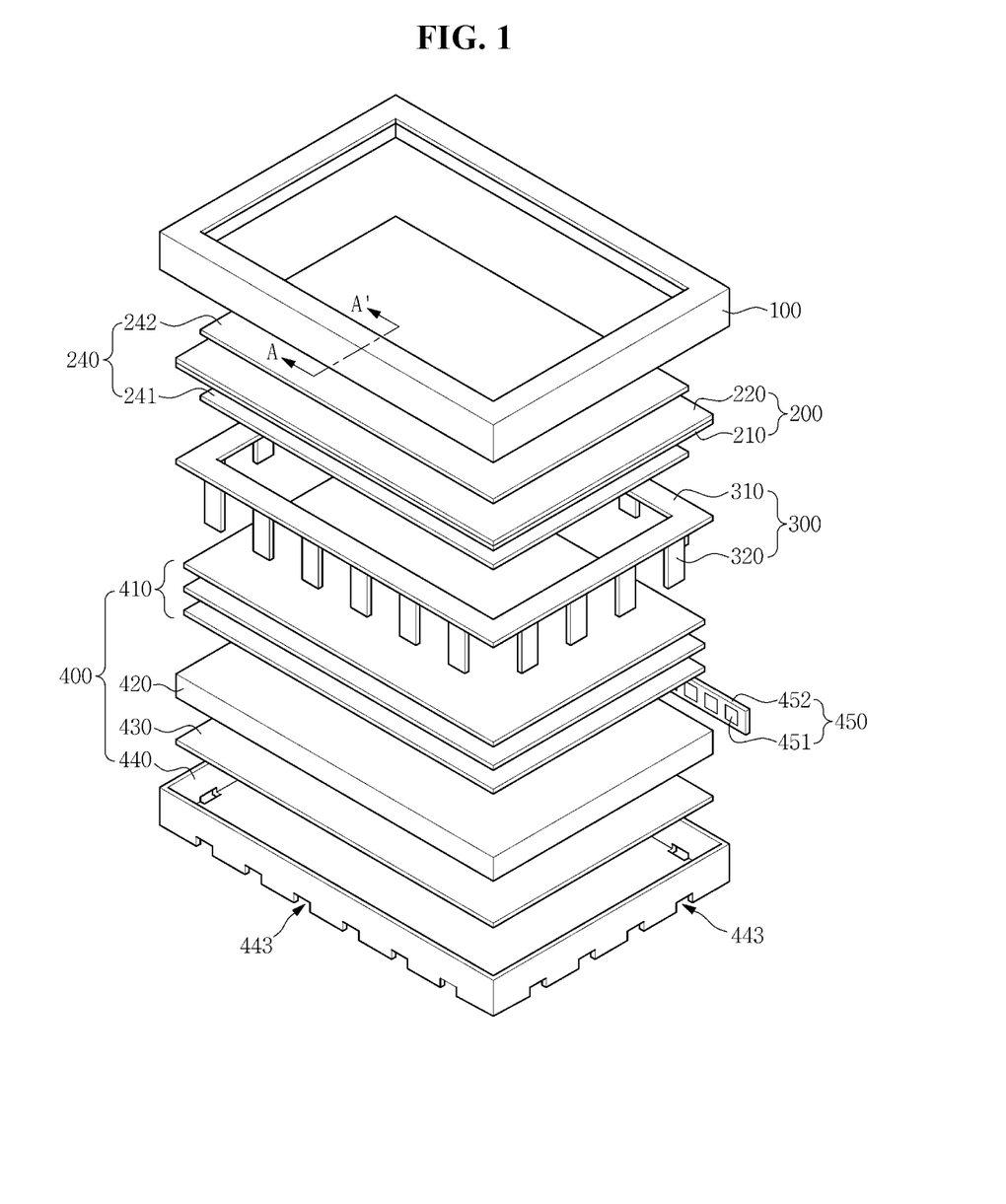
FIG. 1 is a schematic exploded perspective view illustrating an exemplary embodiment of a display device according to the invention.

FIG. 1 is a schematic exploded perspective view illustrating an exemplary embodiment of a display device according to the invention. FIG. 2 is a cross-sectional view taken along line A-A' of FIG. 1.

Figure 2:
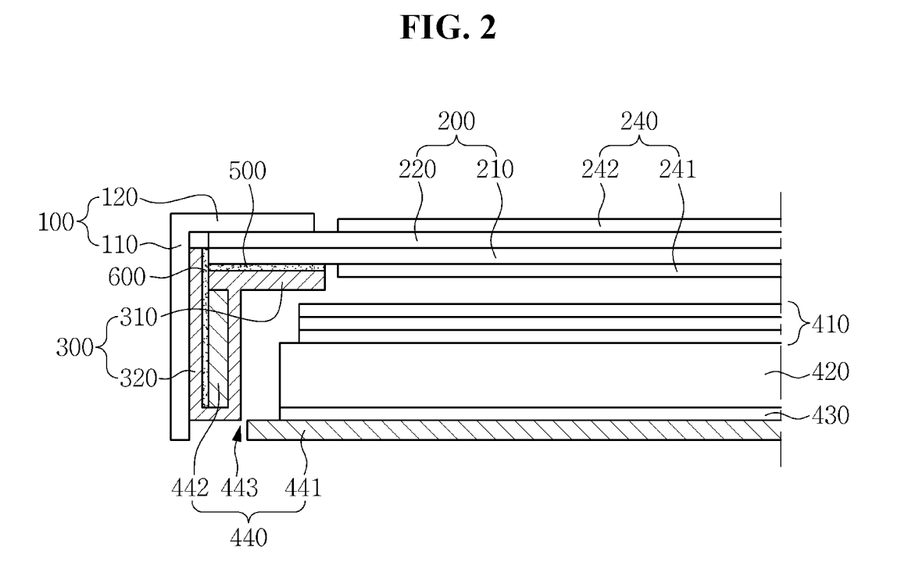
FIG. 2 is a cross-sectional view taken along line A-A' of FIG. 1.

In reference to FIGS. 1 and 2, the display device includes a display panel 200 which displays images, a backlight assembly 400 which generates and provides light to the display panel 200, an upper frame 100 which surrounds the display panel 200, and an intermediate frame 300 on which the display panel 200 is mounted.

The upper frame 100 is coupled to a lower frame 440 of the backlight assembly 400 so as to cover an edge portion of the display panel 200 which is mounted on the intermediate frame 300. The upper frame 100 includes an edge portion 110 coupled to the lower frame 440 and a protruding portion 120 bent from the edge portion 110 and extending therefrom. Portions of the upper frame 100 may define the edge portion 110 thereof and the protruding portion 120 thereof. The edge portion of the display panel 200 covered by the upper frame 100 is a non-display area of the display panel 200 and of the display device. The upper frame 100 defines an opening window in the center thereof, through which a portion of the display panel 200 is exposed.

The upper frame 100 may be coupled to the lower frame 440 through hook coupling and/or screw coupling. In addition, the coupling of the upper frame 100 and the lower frame 440 to each other may be modified in various manners.

The display panel 200 is configured to display images. The display panel 200, which is a light-receiving type display panel, may include a liquid crystal display ("LCD") panel, an electrowetting display panel, an electrophoretic display ("EPD") panel, a microelectromechanical system ("MEMS") display panel, and the like. Herein, an LCD panel will be described by way of example.

The display panel 200 may be provided in a quadrangular planar shape having two pairs of parallel sides in a top plan view. According to the exemplary embodiment, the display panel 200 may have a rectangular shape in the top plan view defined by a pair of relatively long sides and a pair of relatively short sides. The display panel 200 includes a first display substrate 210, a second display substrate 220 opposing the first display substrate 210, and a liquid crystal layer (not illustrated) between the first display substrate 210 and the second display substrate 220. The display panel 200, in a top plan view, includes a display area in which an image is displayed and the non-display area which surrounds the display area and in which an image is not displayed. The non-display area is covered by the upper frame 100.

The first display substrate 210 may include disposed therein a plurality of pixel electrodes (not illustrated) and a plurality of thin film transistors (not illustrated) which is electrically connected to the pixel electrodes in one-to-one correspondence. In the first display substrate 210, a data line is connected to a source electrode of the thin film transistor, a gate line is connected to a gate electrode thereof, and a pixel electrode is connected to a drain electrode thereof. In the first display substrate 210, each of the thin film transistors functions as a switch of a driving signal supplied to a corresponding one of the pixel electrodes. Further, the second display substrate 220 may include disposed therein a common electrode (not illustrated) forming an electric field which controls an alignment of liquid crystals, along with the pixel electrodes. The display panel 200 is configured to drive the liquid crystal layer to display an image frontwards of the display device.

The display panel 200 further includes a driving chip (not illustrated) configured to supply a driving signal, a driving chip mounting film (not illustrated) on which the driving chip is mounted, and a printed circuit board (not illustrated) electrically connected to the display panel 200 through the driving chip mounting film. The driving chip may be a tape carrier package ("TCP").

The driving chip generates a driving signal for driving the display panel 200 in response to an external signal applied thereto. The external signal is supplied from the printed circuit board and may include an image signal, various control signals, a driving voltage, and the like.

A polarizer 240 is disposed on the display panel 200, and collectively includes a first polarizer 241 and a second polarizer 242. The first polarizer 241 and the second polarizer 242 are disposed on surfaces of the first and second display substrates 210 and 220 that are opposite to surfaces of the first and second display substrates 210 and 220 facing one another, respectively. That is, the first polarizer 241 may be attached to an outer side of the first display substrate 210 and the second polarizer 242 may be attached to an outer side of the second display substrate 220. A transmissive axis of the first polarizer 241 is substantially perpendicular with respect to a transmissive axis of the second polarizer 242.

The intermediate frame 300 is coupled to the lower frame 440 and accommodates the display panel 200 therein. The intermediate frame 300 may include or be formed of a flexible material, such as plastic, in order to reduce or effectively prevent damage to the display panel 200.

The intermediate frame 300 is provided along an edge of the display panel 200 and supports the display panel 200 from therebelow. The intermediate frame 300 may be provided at positions corresponding to four sides or at least one of the four sides of the display panel 200 in the top plan view. In an exemplary embodiment, for example, the intermediate frame 300 may have a quadrilateral loop shape corresponding to the four sides of the display panel 200.

The backlight assembly 400 includes an optical sheet 410, a light guide plate 420, a reflective sheet 430, the lower frame 440 and a light source unit 450.

The light source unit 450 includes a light source 451 and a circuit board 452 on which the light source 451 is disposed. The light source unit 450 may be disposed at an edge portion or a light incident side surface of the light guide plate 420. That is, the light source unit 450 may generate and emit light towards the edge portion or the light incident side surface of the light guide plate 420.

The light source 451 may include at least one light emitting diode ("LED") chip (not illustrated) and a package (not illustrated) which accommodates the LED chip therein. In an exemplary embodiment, for example, the light source 451 may have a light emitting surface facing the light guide plate 420 such as facing the light incident side surface of the light guide plate 420. Light emitted from the light source 451 may be blue light, but is not limited thereto.

The circuit board 452, for example, may include a printed circuit board ("PCB") or a metal PCB.

The light source unit 450 may be disposed to correspond to one side surface, two side surfaces, or each of the four side surfaces of the light guide plate 420 or to correspond to at least one of the edge portions of the light guide plate 420, in consideration of the size, luminance, and uniformity of the display panel 200.

The light guide plate 420 defines a light emitting surface thereof, a rear surface thereof opposing the light emitting surface, and the four side surfaces thereof which connect the light emitting surface to the rear surface. The light guide plate 420 receives light emitted from the light source 451 through the light incident side surface thereof, and guides the light toward the light emitting surface thereof facing the display panel 200. The light guide plate 420 uniformly supplies light provided from the light source unit 450 to the display panel 200. The light guide plate 420 is disposed in the vicinity of the light source unit 450, and is accommodated in the lower frame 440. The light guide plate 420 may be provided, for example, in a quadrangular planar shape similar to the shape of the display panel 200, but is not limited thereto. In an exemplary embodiment, where an LED is used as the light source 451, the light guide plate 420 may have various forms including defined therein a predetermined groove and/or a protrusion according to the position of the light source 451.

Although the light guide plate 420 is referred to as a "plate" such as having a relatively large cross-sectional thickness for ease of description, the invention is not limited thereto. In an exemplary embodiment, the light guide plate 420 may be in a shape of a sheet or a film for which the cross-sectional thickness is smaller than that of the plate and is relatively small as compared to the planar size thereof so as to achieve slimness of the display device. That is, the light guide plate 420 is to be understood as having a concept that includes not only a plate but also a film which guides light provided from the light source unit 450.

The light guide plate 420 may include a light-transmissive material. The light-transmissive material may include an acrylic resin, such as polymethylmethacrylate ("PMMA"), or polycarbonate ("PC") so as to guide light efficiently.

A pattern may be disposed on or defined in at least one surface of the light guide plate 420. In an exemplary embodiment, for example, a scattering pattern (not illustrated) may be defined at a lower surface of the light guide plate 420, so as to scatter and/or reflect the guided light upwards towards the display panel 200.

The optical sheet 410 is disposed on the light guide plate 420 and configured to diffuse and/or collimate light directed from the light guide plate 420. The optical sheets 410 may collectively include a diffusion sheet, a prism sheet, a protective sheet, and other functional sheets.

The diffusion sheet is configured to disperse light guided from the light guide plate 420 to thereby reduce or effectively prevent the light from being partly concentrated.

The prism sheet may include prisms having a triangular cross-section and disposed in a predetermined array on one surface thereof. The prism sheet may be disposed on the diffusion sheet and may collimate light diffused from the diffusion sheet in a direction perpendicular to the display panel 200.

The protective sheet may be disposed on the prism sheet and may serve to protect a surface of the prism sheet and diffuse light to achieve uniform light distribution.

The reflective sheet 430 is disposed between the light guide plate 420 and the lower frame 440 and reflects light emitted downwards from the light guide plate 420 to be re-directed toward the display panel 200, thereby improving light efficiency.

The reflective sheet 430 may include, for example, polyethylene terephthalate ("PET"), and thus may have reflectivity. One surface of the reflective sheet 430 body may be coated with a diffusion layer including, for example, titanium dioxide.

In some exemplary embodiments, the reflective sheet 430 body may include or be formed of a material containing metal, such as silver (Ag).

The lower frame 440 may accommodate the reflective sheet 430 and the light guide plate 420 therein. The lower frame 440 may have a bottom portion 441 and a side wall portion 442 extended bent from the bottom portion 441. Portions of the lower frame 440 define the bottom portion 441 thereof and the side wall portion 442 thereof. The bottom portion 441 of the lower frame 440 may be extended parallel to the light guide plate 420. The lower frame 440 may include a relatively rigid metal material, such as stainless steel, or a material having good heat dissipation properties, such as aluminum or an aluminum alloy. According to the exemplary embodiment, the lower frame 440 is responsible for maintaining an overall framework of the display device and protecting a variety of components accommodated therein.

In such a configuration of the display device, a configuration of the display device having a narrow bezel and a secure coupling force of the intermediate frame 300, the lower frame 440 and the display panel 200 will be described with reference to FIGS. 2 to 5.

Figure 3:
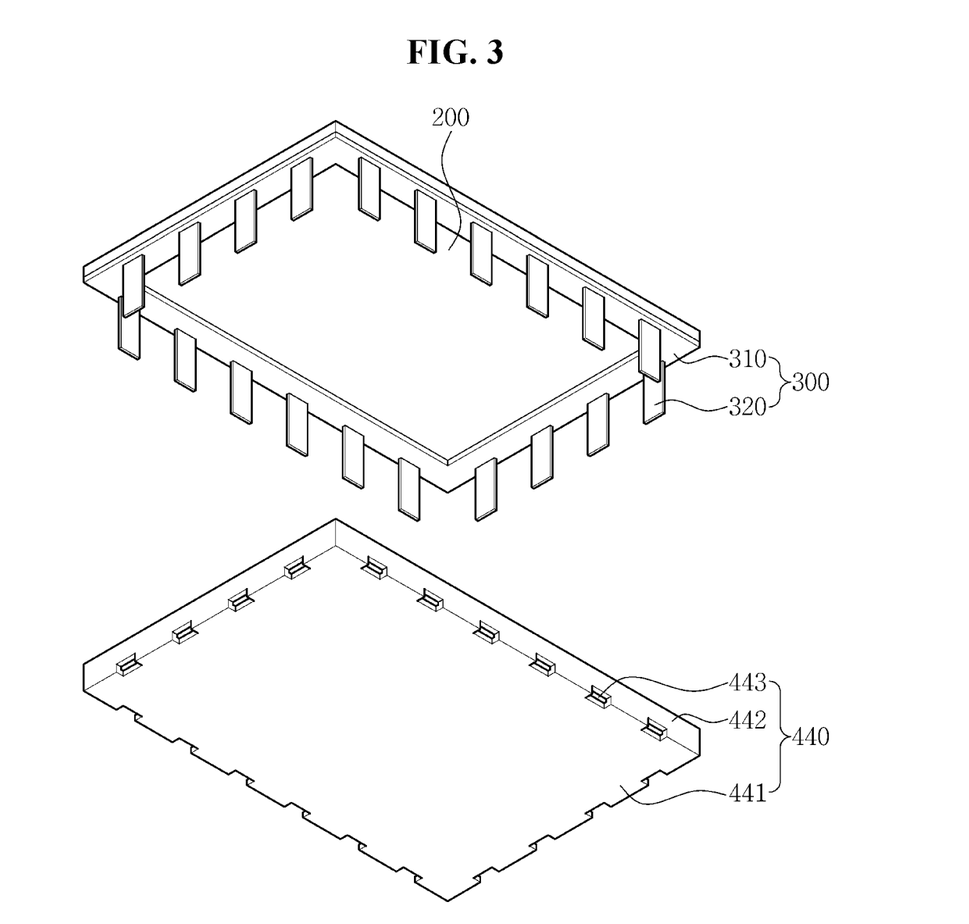
FIG. 3 is a schematic exploded perspective view illustrating an exemplary embodiment of an unassembled state of a display panel, an intermediate frame and a lower frame of a display device according to the invention.
Figure 4:
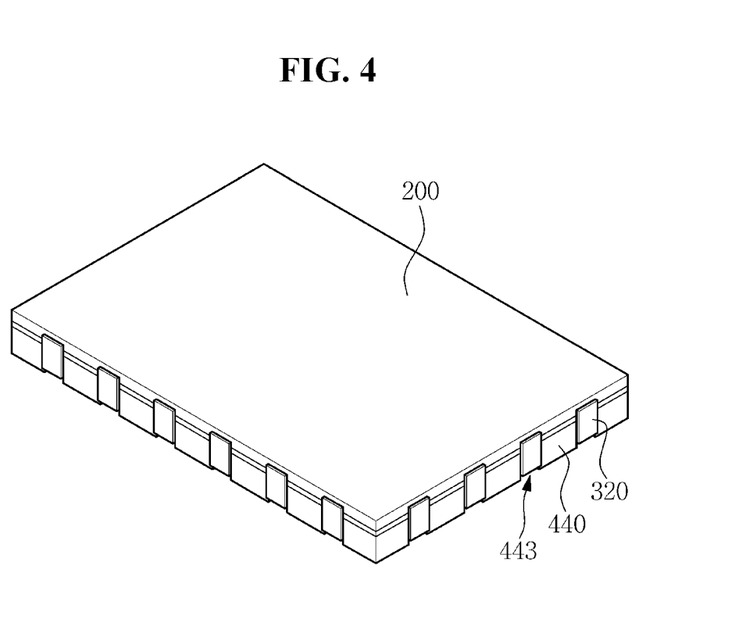
FIGS. 4 and 5 are schematic perspective views illustrating an exemplary embodiment of an assembled state of the display panel, the intermediate frame and the lower frame.
Figure 5:
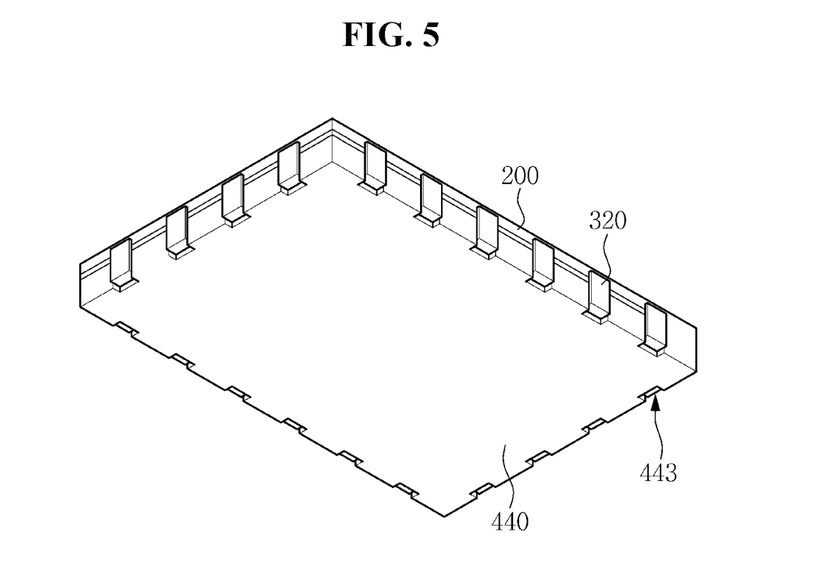

FIG. 3 is a schematic exploded perspective view illustrating an exemplary embodiment of an unassembled state of a display panel 200, an intermediate frame 300 and a lower frame 440 of a display device. FIGS. 4 and 5 are schematic perspective views illustrating an exemplary embodiment of an assembled state of the display panel 200, the intermediate frame 300 and the lower frame 440.

In reference to FIGS. 2 to 5, an exemplary embodiment of the intermediate frame 300 includes a support portion 310 on which the display panel 200 is disposed and a coupling portion 320 extending from a surface of the support portion 310. In a thickness direction of the display device, the coupling portion 320 extending from the surface of the support portion 310 has a total length larger than a total length of the side wall portion 442 of the lower frame 440.

The intermediate frame 300 may include or be formed of a flexible material such as plastic, so as to reduce or effectively prevent damage to the display panel 200. Further, the intermediate frame 300 may include or be formed of a metal material, so as to secure a coupling force and rigidity with respect to the lower frame 440.

In an exemplary embodiment, where the intermediate frame 300 includes or is formed of a metal material, the coupling portion 320 may be defined by a length portion of the intermediate frame 300 extending from the support portion 310 and bent multiple times. Referring to FIG. 2, the coupling portion 320 is defined by two vertical lengths and one horizontal length. The vertical and horizontal lengths of the coupling portion 320 may together define a total (length) of the coupling portion 320. In FIG. 2, a thickness of a vertical length of the coupling portion 320 may be taken in the horizontal direction and a thickness of the horizontal length may be taken in the vertical direction. The length portions of the coupling portion 320 may each a thickness in a range of about 0.1 millimeter (mm) to about 0.3 mm, so as to be bent. The thickness of the coupling portion 320 is not limited to the aforementioned values, and the coupling portion 320 may be manufactured to have a thickness that may secure flexibility and rigidity as well.

The lower frame 440 has a coupling hole 443 defined in the bottom portion 441 thereof and defined in the side wall portion 442 thereof. The coupling hole 443 may be defined at a portion of the lower frame 440 at which the bottom portion 441 and the side wall portion 442 intersect each other. From an intersecting edge of the bottom portion 441 and the side wall portion 442, the coupling hole 443 may be recessed into the bottom portion 441 and into the side wall portion 442 to collectively define a single coupling hole 443.

The coupling portion 320 of the intermediate frame 300 extends into and/or through the coupling hole 443 of the lower frame 440 to be attached to a surface of the lower frame 440. The coupling portion 320 extends through the coupling hole 443 to be disposed outside the lower frame 440. In detail, as illustrated in FIG. 2, the coupling portion 320 is defined by a bent portion of the intermediate frame 300 at the coupling hole 443, and attached to opposing surfaces of the side wall portion 442 of the lower frame. A first (inner) surface of the side wall portion 442 faces a side surface of the light guide plate 420. A second (outer) surface of the side wall portion 442 opposing the first surface thereof faces outwardly toward the edge portion 110 of the upper frame 100. An overall un-bent length of the coupling portion 320 is bent twice in FIG. 2, and may form a quadrangular open-loop shape, for example, "[" shape. The coupling portion 320 may be provided in plural on a surface of the support portion 310 and the coupling hole 443 may defined in plural, as illustrated in FIGS. 3 to 5, and the coupling portions 320 may be spaced apart from each other. The number of the coupling portions 320 may be appropriately adjusted in consideration of the coupling force required for each display device.

A first adhesive member 600 is disposed between the coupling portion 320 and the side wall portion 442 so as to secure coupling force between the intermediate frame 300 and the lower frame 440. The first adhesive member 600 may be a double-sided tape, but is not limited thereto.

The coupling portion 320 may extend from the side wall portion 442 to a side surface of the display panel 200, and may be attached to the side surface of the display panel 200. A distal end of the extended length of the coupling portion 320 may be disposed at the side surface of the display panel 200. Where the coupling portion 320 is attached to the side surface of the display panel 200, the first adhesive member 600 may be disposed between the coupling portion 320 and the side wall portion 442 and further extended to be disposed between the coupling portion 320 and the display panel 200, as illustrated in FIG. 2.

A second adhesive member 500 may further be disposed between the intermediate frame 300 and the display panel 200. The second adhesive member 500 is disposed on an upper surface of the support portion 310, and fixes the display panel 200 to the intermediate frame 300, but is not limited thereto. The second adhesive member 500 may be a double-sided tape but is not limited thereto.

Through the use of the coupling portion 320 and the coupling hole 443 in such a manner, the lower frame 440, the intermediate frame 300 and the display panel 200 are coupled to one another to thereby achieve a relatively narrow bezel.

According to one or more exemplary embodiment according to the invention, unlike in a conventional display device, a configuration such as a screw and a hook for coupling the lower frame 440 and the intermediate frame 300 is omitted, such that a width of a bezel may be decreased as compared to that of the conventional display device. Further, although the configuration such as the screw and hook is omitted in one or more exemplary embodiment according to the invention, the coupling portion 320 of the intermediate frame 300 is firmly fixed to the side wall portion 442 of the lower frame 440, such that coupling force between the lower frame 440 and the intermediate frame 300 is secured similar to that in the conventional display device.

Hereinafter, another exemplary embodiment will be described with reference to FIG. 6. For ease of description, configurations the same as those described in the previous exemplary embodiment will be omitted.

Figure 6:
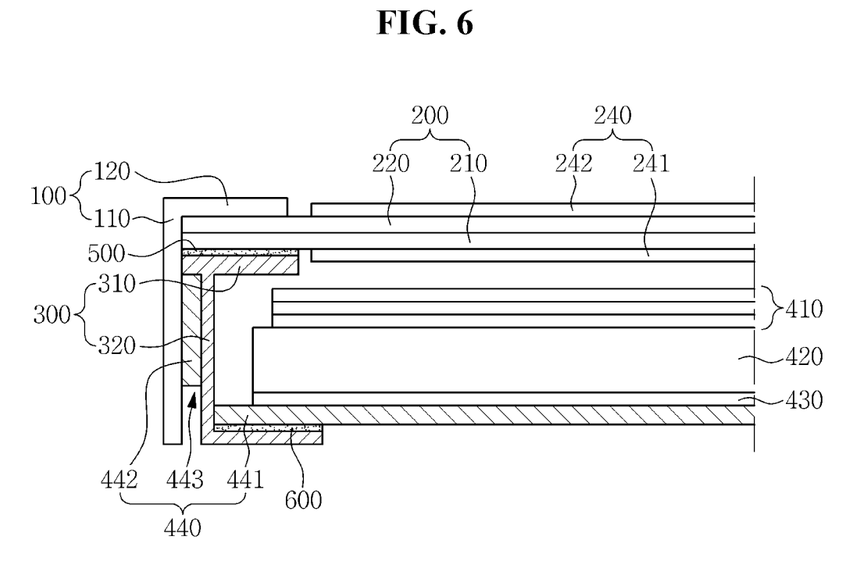
FIG. 6 is a schematic cross-sectional view illustrating another exemplary embodiment of a display device according to the invention.

FIG. 6 is a schematic cross-sectional view illustrating another exemplary embodiment of a display device according to the invention.

In reference to FIG. 6, another exemplary embodiment of a coupling portion 320 according to the invention is defined by a bent portion of the intermediate frame 300 at a coupling hole 443 and is attached to both a surface of a side wall portion 442 of the lower frame 440 and to a surface of a bottom portion 441 of the lower frame 440. As illustrated in FIG. 6, the coupling portion 320 may be attached to a bottom surface of the bottom portion 441 of the lower frame 440, which is dissimilar to the configuration in the previous exemplary embodiment. The coupling portion 320 may have an "L" shape cross-section. A first adhesive member 600 is disposed between the coupling portion 320 of the intermediate frame 300 and the bottom portion 441 of the lower frame 440. In the exemplary embodiment of the display device according to the invention, a width of a bezel may be further decreased.

As set forth above, according to one or more exemplary embodiments, the display device may achieve a narrow bezel and may include an enhanced coupling force between a lower frame, an intermediate frame and a display panel therein, respectively.

From the foregoing, it will be appreciated that various exemplary embodiments in accordance with the present disclosure have been described herein for purposes of illustration, and that various modifications may be made without departing from the scope and spirit of the present teachings. Accordingly, the various exemplary embodiments disclosed herein are not intended to be limiting of the true scope and spirit of the present teachings. Various features of the above described and other embodiments can be mixed and matched in any manner, to produce further exemplary embodiments consistent with the invention.

What is claimed is:

1. A display device comprising:
a display panel which displays an image;
an intermediate frame on which the display panel is disposed; and
a lower frame coupled to the intermediate frame and in which a coupling hole is defined,
wherein
the intermediate frame defines:
a support portion thereof extended facing a lower surface of the display panel, and
a coupling portion thereof extending from a lower surface of the support portion and through the coupling hole defined in the lower frame to be attached to a surface of the lower frame;
the lower frame defines:
a bottom portion thereof, and
a side wall portion thereof which is bent from the bottom portion and extended along the coupling portion of the intermediate frame, the side wall portion defining an inner surface thereof and an outer surface thereof which faces opposite to the inner surface; and
a length of the coupling portion extending from the lower surface of the support portion is bent away from the side wall portion of the lower frame, at the coupling hole defined in the lower frame, and faces the inner surface of the side wall portion of the lower frame and a lower surface of the bottom portion of the lower frame.

2. The display device of claim 1, further comprising an adhesive member between the intermediate frame and the display panel.

3. The display device of claim 1, wherein the length of the coupling portion of the intermediate frame has an "L" shape cross-section and disposes the coupling portion facing both the inner surface of the side wall portion of the lower frame and the lower surface of the bottom portion of the lower frame.

4. The display device of claim 1, further comprising an adhesive member between the coupling portion of the intermediate frame and the bottom portion of the lower frame.

5. The display device of claim 1, further comprising:
a light source which is on the bottom portion of the lower frame and generates and emits light; and
a light guide plate which is between the bottom portion of the lower frame and the display panel and guides the light emitted from the light source toward the display panel.

6. A display device comprising:
a display panel which displays an image;
an intermediate frame on which the display panel is dispose; and
a lower frame coupled to the intermediate frame and in which a coupling hole is defined,
wherein
the intermediate frame defines:
 a support portion thereof extended facing a lower surface of the display panel, and
 a coupling portion thereof extending from a lower surface of the support portion and through the coupling hole defined in the lower frame to be attached to a surface of the lower frame,
the lower frame defines:
 a bottom portion thereof, and
 a side wall portion thereof which is bent from the bottom portion and extended along the coupling portion of the intermediate frame, the side wall portion defining an inner surface thereof and an outer surface thereof which faces opposite to the inner surface, and
a length of the coupling portion extending from the lower surface of the support portion is bent at the coupling hole defined in the lower frame and faces both the inner surface and the outer surface of the side wall portion of the lower frame.

7. The display device of claim 6, wherein the length of the coupling portion is bent twice and disposes the coupling portion facing both the inner surface and the outer surface of the side wall portion of the lower frame.

8. The display device of claim 6, further comprising an adhesive member between the coupling portion of the intermediate frame and the side wall portion of the lower frame.

9. The display device of claim 6, wherein the coupling portion of the intermediate frame is attached to a side surface of the display panel.

10. The display device of claim 9, further comprising an adhesive member between the coupling portion of the intermediate frame and the side wall portion of the lower frame and between the coupling portion of the intermediate frame and the display panel.

11. The display device of claim 6, further comprising:
a light source which is on the bottom portion of the lower frame and generates and emits light; and
a light guide plate which is between the bottom portion of the lower frame and the display panel and guides the light emitted from the light source toward the display panel.

12. The display device of claim 11, wherein the inner surface of the side wall portion of the lower frame faces a side surface of the light guide plate.

13. A display device comprising:
a display panel which displays an image;
an intermediate frame on which the display panel is dispose; and
a lower frame coupled to the intermediate frame and in which a coupling hole is defined,
wherein
the intermediate frame defines:
 a support portion thereof extended facing a lower surface of the display panel, and
 a coupling portion thereof extending from a lower surface of the support portion and toward the lower frame; and
the coupling portion of the intermediate frame extends through the coupling hole defined in the lower frame to be attached to a side surface of the display panel.

* * * * *